United States Patent
Arai et al.

[11] Patent Number: 4,943,613
[45] Date of Patent: Jul. 24, 1990

[54] PHOTOCURABLE ORGANOPOLYSILOXANE COMPOSITION

[75] Inventors: Masatoshi Arai; Kazutoshi Fujioka, both of Annaka; Masaharu Satou, Takasaki, all of Japan

[73] Assignee: Shin-Etsu Chemical Co., Ltd., Tokyo, Japan

[21] Appl. No.: 357,977

[22] Filed: May 26, 1989

[30] Foreign Application Priority Data

May 31, 1988 [JP] Japan .................. 63-133856

[51] Int. Cl.$^5$ ............................. C08K 5/09
[52] U.S. Cl. ............................. 524/773; 522/99; 524/300
[58] Field of Search ............ 524/773, 300; 522/99

[56] References Cited

U.S. PATENT DOCUMENTS 4,201,808  5/1980  Cully et al. .................. 428/447

Primary Examiner—Melvyn I. Marquis
Attorney, Agent, or Firm—Wyatt, Gerber, Burke and Badie

[57] ABSTRACT

The photocurable organopolysiloxane composition is curable by irradiation with ultraviolet light into a rubbery elastomer which is excellently adhesive to the surface of the substrate on which it has been cured. The composition comprises an organopolysiloxane having, in a molecule, at least one acryloxy-functional group represented by the general formula

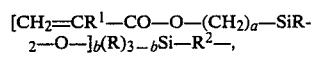

in which $R^1$ is a hydrogen atom or a methyl group, each R is a monovalent hydrocarbon group, $R^2$ is an oxygen atom or a divalent hydrocarbon group and each of the subscripts a and b is 1, 2 or 3, as the principal ingredient together with an acryloxy-containing trialkoxy silane represented by the general formula

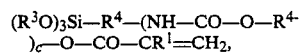

in which each $R^3$ is a monovalent hydrocarbon group, each $R^4$ is a divalent hydrocarbon group having 1 to 20 carbon atoms, $R^1$ has the same meaning as defined above and the subscript c is zero or 1, acrylic or methacrylic acid and a photosensitizer.

4 Claims, No Drawings

PHOTOCURABLE ORGANOPOLYSILOXANE COMPOSITION

BACKGROUND OF THE INVENTION

The present invention relates to a novel photocurable organopolysiloxane composition or, more particularly, to a photocurable organopolysiloxane composition having excellent storage stability and capable of giving a cured rubbery elastomer by irradiation with ultraviolet light exhibiting good adhesion to the substrate surface of various materials such as glass, metals, plastics, ceramics and the like on which the composition has been cured so as to be useful in applications, for example, as an adhesive, sealing and caulking material, coating agent, potting agent and the like.

It is well known that, besides organopolysiloxane compositions compounded with an organic peroxide which can be cured by heating into a rubbery elastomer having excellent heat and cold resistance, weatherability and electric properties, silicone rubbers can be obtained by the crosslinking reaction of a photocurable organopolysiloxane composition compounded with a specific organopolysiloxane and a photosensitizer by the irradiation with ultraviolet light.

The photocurable organopolysiloxane compositions can be classified into several classes depending on the types of the photosensitive functional groups in the organopolysiloxanes. For example, Japanese Patent Publication No. 52-40334 and Japanese Patent Kokai No. 60-104158 disclose a photocurable organopolysiloxane composition curable by the light-induced radical addition reaction between vinyl groups in a first organopolysiloxane and mercapto groups in a second organopolysiloxane. The applicability of the compositions of this type in practical use is limited in respect of the problems of unpleasant odor and corrosiveness against metals responsible for the mercapto groups. Further, Japanese Patent Publication No. 53-36515 and Japanese Patent Kokai No. 60-215009 disclose a photocurable organopolysiloxane composition comprising an organopolysiloxane having acryloxy groups at the molecular chain ends and a photosensitizer and curable by irradiation with light. A problem in the compositions of this type is that, when a rubbery elastomer is desired by curing the composition, the organopolysiloxane should have a sufficiently large degree of polymerization so that the relative content of the acryloxy groups at the molecular chain ends is unavoidably decreased to such an extent that the composition is only poorly curable. In addition, the curability of the composition of this type is subject to the inhibition by the atmospheric oxygen so that the surface layer of the composition can hardly be cured in air when the relative content of the acryloxy groups is low. This situation leads to a limitation in the applicability of the photocurable organopolysiloxane composition of this type that only those compositions curable not to a rubbery elastomer but to a resinous cured material can be practically used.

The inventors have previously proposed a photocurable organopolysiloxane composition capable of giving a rubbery elastomer by compounding a photosensitizer and a specific organopolysiloxane of a linear molecular structure having two or more acryloxy groups at each molecular chain end. Although the composition of this type is curable into a fully cured rubbery elastomer suitable for practical use, a problem therein is that the thus cured rubbery elastomer is poorly adhesive to the substrate surface on which it has been cured by irradiation with light, especially, when the substrate material is glass or a metal so that the applicability thereof is limited as an adhesive or sealing agent. This problem of poor adhesion, for example, to glass surfaces can be partly solved by compounding the composition with an organosilicon compound having an amino or acryloxy group in the molecule but the effectiveness of this measure is still limited because the adhesiveness between the cured composition and the substrate surface can be exhibited only by taking an unduly long time and no sufficient improvement can be obtained when the substrate is made of a material other than glass.

SUMMARY OF THE INVENTION

The present invention, completed as a result of the extensive investigations to solve the above described problems, provides a photocurable organopolysiloxane composition capable of giving a fully cured rubbery elastomer by irradiation with light, which comprises, in admixture:

(a) 100 parts by weight of an organopolysiloxane having, in a molecule, at least one acryloxy-functional group represented by the general formula

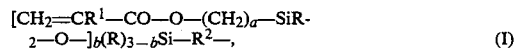

in which $R^1$ is a hydrogen atom or a methyl group, each R is a monovalent hydrocarbon group independently from the others, $R^2$ is an oxygen atom or a divalent hydrocarbon group and each of the subscripts a and b is 1, 2 or 3;

(b) from 0.01 to 10 parts by weight of an acryloxy-containing trialkoxy silane represented by the general formula

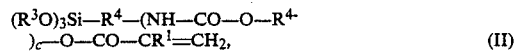

in which each $R^3$ is a monovalent hydrocarbon group having 1 to 8 carbon atoms, each $R^4$ is a divalent hydrocarbon group having 1 to 20 carbon atoms independently from the others, $R^1$ has the same meaning as defined above and the subscript c is zero or 1;

(c) from 0.01 to 10 parts by weight of a carboxylic acid represented by the general formula

in which R, is a monovalent hydrocarbon group having 1 to 20 carbon atoms; and (d) from 0.01 to 10 parts by weight of a photosensitizer.

DETAILED DESCRIPTION OF THE PREFERRED EMBODIMENTS

The above described photocurable organopolysiloxane composition of the invention is characterized by the specific ingredients, i.e. components (b) and (c), by virtue of which the composition is rapidly cured by irradiation with ultraviolet light to instantaneously exhibit good adhesion to the substrate surface of any kind of materials including glass, metals, plastics and ceramics.

The base ingredient in the inventive composition is the component (a) which is an organopolysiloxane having, in a molecule, at least one acryloxy functional group represented by the general formula $$[CH_2=CR^1-CO-O-(CH_2)_a-SiR_2-O-]_b(R)_{3-b}Si-R^2-, \quad (I)$$

in which $R^1$ is a hydrogen atom or a methyl group, each R is a monovalent hydrocarbon group independently from the others, $R^2$ is an oxygen atom or a divalent hydrocarbon group and each of the subscripts a and b is 1, 2 or 3. The monovalent hydrocarbon group denoted by R is exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted monovalent hydrocarbon groups obtained by replacing a part or all of the hydrogen atoms in the above named hydrocarbon groups with halogen atoms or cyano groups exemplified by chloromethyl, 2-cyanoethyl and 3,3,3-trifluoropropyl groups. Two kinds or more of these substituted or unsubstituted monovalent hydrocarbon groups can be contained in a single group of the formula (I). It is preferable that all or most of the groups enoted by R are methyl groups. The symbol R denotes an oxygen atom or a divalent hydrocarbon group which is bonded to a silicon atom forming the siloxane linkage in the organopolysiloxane molecule. The divalent hydrocarbon group denoted by $R^2$ is preferably an ethylene group —$CH_2CH_2$—. The subscript a is 1, 2 or 3 so that the acryloxy group $CH_2=CR^1-CO-O-$ is bonded to the silicon atom through a methylene, ethylene or propylene group, respectively. The subscript b is also 1, 2 or 3 so that the group of the formula (I) has one, two or three acryloxyalkyl dihydrocarbyl siloxy groups, respectively.

Examples of the organopolysiloxane as the component (a) having at least one group expressed by the general formula (I) include those expressed by the following structural formulas, in which the symbols Me, Et, Ph and Fp denote methyl, ethyl, phenyl and 3,3,3-trifluoropropyl groups, respectively, and the subscripts p, q, r and s are each a positive integer:

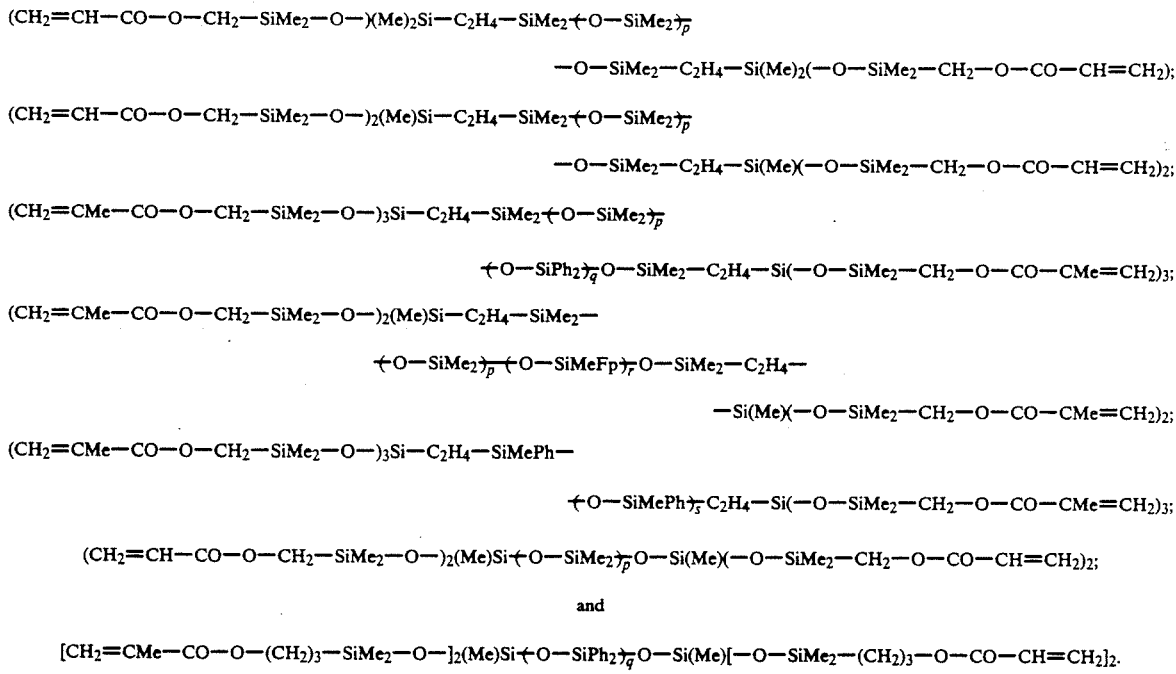

The above described organopolysiloxanes suitable as the component (a) can be synthesized, for example, in the method described below. In the first place, a chlorosilane compound represented by the general formula $$H-Si(Cl)_b(R)_{3-b} \quad (IV)$$

in which R and b each have the same meaning as defined above, is reacted with an organopolysiloxane having, in a molecule, at least one group represented by the general formula $$CH_2=CH-(R^6)_d-SiR_2-O-, \quad (V)$$

in which $R^6$ is a divalent hydrocarbon group and the subscript d is 0 or 1, at 50° to 80° C. in the presence of a platinum compound such as chloroplatinic acid in the form of an isopropyl alcohol solution as the catalyst to give a modified organopolysiloxane having at least one group represented by the general formula $$(Cl)_b(R)_{3-b}Si-CH_2CH_2-(R^6)_d-SiR_2-O-. \quad (VI)$$

The chlorosilane compound of the formula (IV) is exemplified by dimethyl chlorosilane, methyl dichlorosilane, trichlorosilane and the like and the organopolysiloxane having the group of the formula (V) is exemplified by those expressed by the following structural formulas, in which the symbols Me, Ph, Vi, All and Fp denote methyl phenyl, vinyl, allyl and 3,3,3-trifluoropropyl groups, respectively, and the subscripts p, q, r, s and t are each a positive integer:

$$CH_2=CH-SiMe_2(\!-\!O-SiMe_2)_{\overline{p}}CH=CH_2;$$

-continued $CH_2=CH-SiMe_2(-O-SiMe_2)_p(-O-SiPh_2)_q O-SiMe_2-CH=CH_2;$ $CH_2=CH-SiMe_2(-O-SiMe_2)_p(-O-SiMeFp)_r O-SiMe_2-CH=CH_2;$ $CH_2=CH-SiMe_2(-O-SiMe_2)_p(-OSiMeVi)_s O-SiMe_2-CH=CH_2;$ $(CH_2=CH-)(Me)(Ph)Si(-O-SiMe_2)_p(-O-SiPh_2)_q O-Si(Me)(Ph)(-CH=CH_2);$ and $CH_2=CH-SiMe_2(-O-SiMe_2)_p(-O-SiMeAll)_t O-SiMe_2-CH=CH_2.$ The modified organopolysiloxane having the group of the formula (VI) is exemplified by those expressed by the following formulas:

$(Cl)_2(Me)Si-C_2H_4-SiMe_2(-O-SiMe_2)_p C_2H_4-Si(Me)(Cl)_2;$ $(Cl)(Me)_2Si-C_2H_4-SiMe_2(-O-SiMe_2)_p C_2H_4-Si(Me)_2(Cl);$ $(Cl)_3Si-C_2H_4-SiMe_2(-O-SiMe_2)_p(-O-SiPh_2)_q O-SiMe_2-Si(Cl)_3;$ $(Cl)_2(Me)Si-C_2H_4-SiMe_2(-O-SiMe_2)_p(-O-SiMeFp)_r O-SiMe_2-C_2H_4-Si(Me)(Cl)_2;$ $(Me)_3Si(-O-SiMe_2)_p[-O-Si(Me)(-C_2H_4-SiCl_3)]_t O-Si(Me)_3.$

In the next place, the thus obtained modified organopolysiloxane having one or more of silicon-bonded chlorine atoms at each molecular chain end is reacted with a (meth)acryloxyalkyl containing silanol compound of the general formula $$CH_2=CR^1-CO-O-(CH_2_a-SiR^2-OH, \quad (VII)$$

in which $R^1$, R and a each have the same meaning as defined above, such as acryloxymethyl dimethyl silanol, 3-acryloxypropyl dimethyl silanol, methacryloxymethyl dimethyl silanol, 3-methacryloxypropyl dimethyl silanol and the like, in an approximately equimolar amount to the chlorine atoms in the modified organopolysiloxane to effect the dehydrochlorination reaction at room temperature in the presence of an acid acceptor such as triethyl amine.

The component (b) is an acryloxy containing trialkoxysilane compound represented by the general formula (II) and serves to impart the inventive composition with adhesiveness to the surface of the substrate on which the composition is cured. In the general formula (II), $R^3$ denotes a monovalent hydrocarbon group having 1 to 8 carbon atoms selected from the class consisting of alkyl, cycloalkyl, alkenyl and aryl groups and $R^4$ denotes a divalent hydrocarbon group having up to 20 carbon atoms. The symbol $R^1$ has the same meaning as defined above. The subscript c is zero or 1 so that the silane compound does not have or has a linkage $-N-H-CO-O-R^4-$ in the molecule, respectively.

Examples of the acryloxy-containing trialkoxy silane compound suitable as the component (b) include those expressed by the following structural formulas, the symbols Me and Et denoting a methyl and ethyl group, respectively, of which the subscript c is zero in each of the former six and 1 in each of the other six:

$(MeO)_3SiCH_2OCOCH=CH_2;$
$(MeO)_3SiCH_2OCOCMe=CH_2;$
$(MeO)_3Si(CH_2)_3OCOCH=CH_2;$
$(MeO)_3Si(CH_2)_3OCOCMe=CH_2;$
$(EtO)_3Si(CH_2)_3OCOCH=CH_2;$
$(EtO)_3Si(CH_2)_3OCOCMe=CH_2;$
$(MeO)_3Si(CH_2)_3NHCOOC_3H_4OCOCH=CH_2;$
$(MeO)_3Si(CH_2)_3NHCOOC_3H_4OCOCMe=CH_2;$
$(MeO)_3Si(CH_2)_3NHCOOC_3H_6OCOCH=CH_2;$
$(MeO)_3Si(CH_2)_3NHCOOC_3H_6OCOCMe=CH_2;$
$(EtO)_3Si(CH_2)_3NHCOOC_2H_4OCOCH=CH_2;$ and
$(EtO)_3Si(CH_3)_3NHCOOC_3H_6OCOCH=CH_2.$ These compounds, especially, expressed by the general formula (II) in which the subscript c is 1 can be synthesized, typically, in the following method. Thus, an isocyanato group-containing trialkoxy silane compound represented by the general formula $$(R^3O)_3Si-R^4-NCO,$$

in which $R^3$ and $R^4$ each have the same meaning as defined above, is reacted with an hydroxyhydrocarbyl acrylate of the general formula $$HO-R^4-O-CO-CR^1=CH_2,$$

in which $R^1$ and $R^4$ each have the same meaning as defined above, in the presence of a catalyst such as dibutyl tin maleate and the like.

The amount of the acryloxy-containing trialkoxy silane as the component (b) in the inventive composition is in the range from 0.01 to 10 parts by weight per 100 parts by weight of the organopolysiloxane as the component (a). When the amount of the component (b) is too small, no desired improvement can be obtained in the adhesion of the cured composition to the substrate surface on which it has been cured. When the amount thereof is too large, on the other hand, certain inhibitive effects are caused on the curing behavior of the composition.

The component (c) in the inventive photocurable organopolysiloxane composition is a carboxylic acid represented by the general formula (III) given above, in which $R^5$ denotes a monovalent hydrocarbon group having up to 20 carbon atoms. Examples of carboxylic acids suitable as the component (c) include acetic acid, propionic acid, butyric acid, acrylic acid, methacrylic acid, crotonic acid, α-methyl crotonic acid, cinnamic acid, benzoic acid and the like.

The amount of the carboxylic acid as the component (c) in the inventive composition is in the range from 0.01 to 10 parts by weight per 100 parts by weight of the organopolysiloxane as the component (a). When the amount of the component (c) is too small, no desired improvement can be obtained in the adhesion of the cured composition to the substrate surface on which it has been cured. When the amount thereof is too large, on the other hand, certain inhibitive effects are caused on the curing behavior of the composition.

The component (d) in the inventive composition is a photosensitizer which promotes photopolymerization of the acryloxy groups in the organopolysiloxane as the component (a). Various kinds of photosensitizing compounds known in the art can be used as the component (d). Examples of suitable photosensitizer compounds include acetophenone, propiophenone, benzophenone, xanthone, fluorene, benzaldehyde, anthraquinone, triphenylamine, carbazole, 3-methyl acetophenone, 4-methyl acetophenone, 3-pentyl acetophenone, 4-methoxy acetophenone, 3-bromo acetophenone, 4-allyl acetophenone, 1,4-diacetylbenzene, 3-methyl benzophenone, 4-methyl benzophenone, 4-chlorobenzophenone, 4,4'-dimethoxy benzophenone, 4-chloro-4'-benzyl benzophenone, 3-chloroxanthone, 3,9-dichloroxanthone, 3-chloro-8-nonylxanthone, benzoin, benzoin methyl ether, benzoin butyl ether, bis(4-dimethylaminophenyl) ketone, (1-methyl-1-hydroxy)ethyl phenyl ketone, diethoxymethyl phenyl ketone, benzylmethoxyketal, 2-chlorothioxanthone, diethylacetophenone, 1-hydroxycyclohexyl phenyl ketone, (1-hydroxy-1-methyl)ethyl phenyl ketone, 2-methyl[4-(methylthio)-phenyl] 2-morpholino-1-propane, 2,2-dimethoxy-2-phenyl acetophenone and the like.

The amount of the photosensitizer as the component (c) in the inventive composition is in the range from 0.01 to 10 parts by weight per 100 parts by weight of the organopolysiloxane as the component (a). When the amount thereof is too small, substantially no curing reaction proceeds by irradiation of the composition with ultraviolet light. When the amount thereof is too large, on the other hand, adverse influences are caused on the physical properties of the cured product with a decrease in the mechanical strength.

The photocurable organopolysiloxan composition of the invention can be prepared by uniformly blending the above described components (a) to (d) each in a specified amount. The composition may further be admixed according to need with a small amount of a finely divided silica filler such as fumed silica with an object to improve the mechanical strength of the rubbery elastomer obtained by curing the composition although the amount thereof is limited so as not to unduly decrease the light transmission through the composition in order to ensure good photocurability. It is of course optional that various kinds of known additives are admixed with the composition each in a limited amount including thixotropic agents, heat-resistance improvers, coloring agents and the like.

The photocurable organopolysiloxane composition of the invention prepared in the above described manner is highly sensitive to and rapidly cured by the irradiation with ultraviolet light for a very short time of 1 to 20 seconds though depending on the intensity of the ultraviolet irradiation to give a cured rubbery elastomer which is firmly bonded adhesively to the substrate surface on which it has been cured. Accordingly, the inventive organopolysiloxane composition is useful as a potting agent, sealing agent, coating agent and the like of electric and electronic components manufactured in a line production system.

In the following, the photocurable organopolysiloxane composition of the invention is described in more detail by way of examples as preceded by a description of the synthetic preparation of the organopolysiloxane as the component (a). In the following description, the term of "parts" always refers to "parts by weight" and the values of viscosity are all those obtained by the measurements at 25° C.

Synthetic Preparation 1

Into a flask of 2 liter capacity equipped with a thermometer, reflux condenser and stirrer were introduced 1000 g of an α,ω-divinyl dimethylpolysiloxane having a viscosity of 1000 centistokes and expressed by the formula

in which Vi and Me denote vinyl and methyl groups, respectively, containing 0.018 mole of vinyl groups per 100 g and, after dehydration of the organopolysiloxane by heating for 2 hours at 120° C. under a stream of nitrogen gas and cooling, 0.1 g of an isopropyl alcohol solution of chloroplatinic acid in a concentration of 2% by weight as platinum and 12.3 g of methyl dichlorosilane were added to the flask. The reaction mixture was heated at 90° C. for 2 hours to effect the reaction and then freed from the unreacted methyl dichlorosilane by bubbling nitrogen gas thereinto at the same temperature.

Thereafter, 17.2 g of acryloxymethyl dimethyl silanol were added dropwise to the reaction mixture with addition of 23.8 g of triethyl amine and 0.4 g of 2,6-di(tert-butyl)-4-methyl phenol taking 30 minutes and the reaction mixture was kept at 60° C. for 2 hours to effect the reaction. After completion of the reaction, the reaction mixture was diluted by adding 500 g of toluene and filtered to remove the precipitates of the salt. The filtrate was freed from the toluene and the excess of triethyl amine by stripping at 100° C. under a reduced pressure of 2 mmHg to give 920 g of a clear and colorless modified organopolysiloxane having a viscosity of 3400 centistokes, which is referred to as the polysiloxane I hereinbelow, as a product. This product organopolysiloxane is expressed by the formula

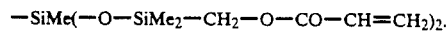

Synthetic Preparation 2

Into a flask of 2 liter capacity equipped with a thermometer, reflux condenser and stirrer were introduced 1000 g of an α,ω-divinyl dimethyldiphenylpolysiloxane having a viscosity of 3400 centistokes and expressed by the formula

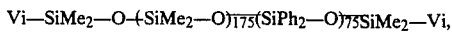

in which Vi, Ph and Me denote vinyl, phenyl and methyl groups, respectively, containing 0.018 mole of vinyl groups per 100 g and, after dehydration of the organopolysiloxane by heating for 2 hours at 120° C. under a stream of nitrogen gas and cooling, 0.1 g of an isopropyl alcohol solution of chloroplatinic acid in a concentration of 2% by weight as platinum and 12.2 g of methyl dichlorosilane were added to the flask. The reaction mixture was heated first at 50° C. for 1 hour and then at 80° C. for 3 hours to effect the reaction and then freed from the unreacted methyl dichlorosilane by bubbling nitrogen gas thereinto at the same temperature.

Thereafter, 34.1 g of acryloxymethyl dimethyl silanol were added dropwise to the reaction mixture with addition of 21.5 g of triethyl amine and 0.4 g of 2,6-di(tert-butyl)-4-methyl phenol taking 30 minutes and the reaction mixture was kept at 60° C. for 2 hours to effect the reaction. After completion of the reaction, the reaction mixture was filtered to remove the precipitates of the salt formed by the reaction. The filtrate was freed from the excess of triethyl amine by stripping at 100° C. under a reduced pressure of 2 mmHg to give 900 g of a clear and colorless modified organopolysiloxane, which is referred to as the polysiloxane II hereinbelow, as a product. This product organopolysiloxane is expressed by the formula

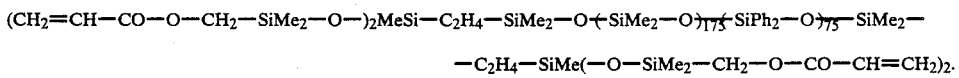

Synthetic Preparation 3

The procedure was substantially the same as in Synthetic dimethyl diphenyl polysiloxane was replaced with the same amount of another α,ω-divinyl dimethyl diphenyl polysiloxane expressed by the formula

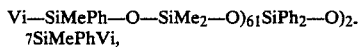

in which Vi, Ph and Me denote vinyl, phenyl and methyl groups, respectively, and the amounts of the methyl dichlorosilane, triethyl amine and acryloxymethyl dimethyl silanol were 33.8 g, 59.4 g and 94.1 g, respectively, to give 880 g of a clear and colorless product, which is referred to as the polysiloxane III hereinbelow, expressed by the following formula

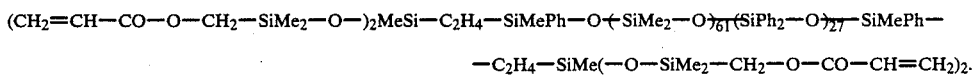

EXAMPLE 1 and COMPARATIVE EXAMPLE 1

An organopolysiloxane composition, referred to as the composition I hereinbelow, was prepared in Example 1 by uniformly blending 100 parts of the polysiloxane I prepared in Synthetic Preparation 1 described above, 1 part of 3-methacryloxypropyl trimethoxy silane, referred to as the acryl silane I hereinbelow, 0.5 part of acrylic acid, referred to as the acid 1 hereinbelow, and 2.0 parts of 1-hydroxycyclohexyl phenyl ketone, referred to as the photosensitizer I hereinbelow. In Comparative Example I, for comparison, another organopolysiloxane composition, referred to as the composition II hereinbelow, was prepared in the same formulation as above excepting omission of the acryl silane I and the acid I.

Each of the compositions I and II was spread in a thickness of 2 mm on a plate of 120 mm by 120 mm wide and irradiated with ultraviolet light by moving three times below an ultraviolet lamp at a velocity of 1 meter/minute so that the layer of the composition was converted into a sheet of a cured rubber of which mechanical properties were measured according to the procedure specified in JIS K 6301. Separately, the composition was used for adhesively bonding two glass plates of 25 mm wide and 75 mm long sandwiching a 1 mm thick adhesive layer each at the 10 mm long end portion, the other end of a plate extending to the reverse direction of that of the other, and the shearing adhesive bonding strength was determined after curing by irradiation with the same ultraviolet lamp as above through the glass plate. The results of these measurements were as shown in Table 1 below. Cohesive failure took place in all of the measurements with the composition I but in none of the measurements with the composition II.

EXAMPLES 2 to 4 and COMPARATIVE EXAMPLES 2 to 4

Three compositions, referred to as the compositions III, IV and V in Examples 2, 3 and 4, respectively, were prepared each by uniformly blending 100 parts of the polysiloxane II prepared in Synthetic Preparation 2, 1.0 part of the acryl silane I or 3-acryloxypropyl trimethoxy silane, referred to as the acryl silane II hereinbelow, 0.5 part of the acid I or methacrylic acid, referred to as the acid II hereinbelow, 3.0 parts of (1-hydroxy-1-methyl)ethyl phenyl ketone, referred to as the photosensitizer II hereinbelow, and 12 parts of a fumed silica filler having a specific surface area of 200 m²/g and surface-treated with hexamethyl disilazane, referred to as the silica I hereinbelow, as shown in Table 2.

Three more compositions, referred to as the compositions VI, VII and VIII, were prepared in Comparative Examples 2, 3 and 4, respectively, each in a similar formulation to above but with omission of both of the acryl silanes and the acids (composition VI), omission of the acids (composition VII) and omission of the acryl silanes (composition VIII).

Each of these six compositions was subjected to the same tests as in Example 1 to give the results shown in Table 1. Cohesive failure took place always with the compositions III, IV and V but in none of the measurements with the compositions VI, VII and VIII. These results clearly indicate that the synergistic effect of the acryl silane and the acid is essential in order that the composition can exhibit good adhesion to the surface of glass substrates on which the composition has been cured.

EXAMPLES 5 to 7 and COMPARATIVE EXAMPLES 5 to 7

Three compositions IX, X and XI in Examples 5, 6 and 7, respectively, were prepared each by uniformly blending 100 parts of the polysiloxane III prepared in Synthetic Preparation 3 described above with an acryloxy containing trialkoxy silane of the formula

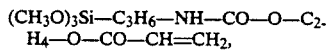
(CH₃O)₃Si—C₃H₆—NH—CO—O—C₂H₄—O—CO—CH=CH₂, referred to as the acryl silane III hereinbelow, the acid I or II, 3.0 parts of the photosensitizer I and a fumed silica filler having a specific surface area of 200 m²/g and surface-treated with dimethyl dichlorosilane, referred to as the silica II hereinbelow, each in an amount indicated in Table 2.

Three more compositions, referred to as the compositions XII, XIII and XIV, were prepared in Comparative Examples 5, 6 and 7, respectively, each in a similar formulation to above but with omission of both of the acryl silanes and the acids (composition XII), omission of the acids (composition XIII) and omission of the acryl silanes (composition XIV).

Each of the compositions IX to XIV was shaped and cured in the same manner as in Example 1 to give a cured rubber sheet of which the mechanical properties were determined. Separately, the composition was subjected to the test of adhesion for the shearing adhesive strength by using three kinds of test panels including those of glass, acrylic rein and steel to give the results shown in Table 2. The adhesion test with the steel plate was conducted by bonding a steel plate and a glass plate with the composition and irradiating the composition through the glass plate. The percentages of cohesive failure in these adhesion tests were 100% with each of the compositions IX, X and XI and 0% with each of the compositions XII, XIII and XIV clearly indicating that the synergistic effect of the acryl silane and the acid was essential in order that the composition could exhibit good adhesive to the surface of the substrates on which the composition had been cured.

TABLE 1

| Composition No. | Hardness, JIS A | Tensile strength, kgf/cm² | Ultimate elongation, % | Shearing adhesive bonding strength, kgf/cm² | | |
|---|---|---|---|---|---|---|
| | | | | Glass | Acrylic resin | Steel |
| I | 30 | 4.5 | 100 | 3.9 | | |
| II | 29 | 4.0 | 90 | 0.2 | | |
| III | 40 | 11 | 150 | 7.5 | | |
| IV | 40 | 12 | 150 | 6.5 | | |
| V | 45 | 15 | 120 | 10.2 | | |
| VI | 40 | 14 | 150 | 1.4 | | |
| VII | 41 | 14 | 160 | 1.1 | | |
| VIII | 42 | 14 | 140 | 0.9 | | |
| IX | 24 | 5.8 | 100 | 4.0 | 3.0 | 3.5 |
| X | 33 | 12 | 150 | 7.2 | 6.6 | 6.3 |
| XI | 40 | 15 | 170 | 11 | 8.2 | 9.1 |
| XII | 30 | 11 | 140 | 0.6 | 0.7 | 0.9 |
| XIII | 31 | 10 | 130 | 1.2 | 0.8 | 0.8 |
| XIV | 33 | 12 | 150 | 1.3 | 0.8 | 1.1 |

TABLE 2

| Composition No. | III | IV | V | VI | VII | VIII | IX | X | XI | XII | XIII | XIV |
|---|---|---|---|---|---|---|---|---|---|---|---|---|
| Polysiloxane | II | II | II | II | II | II | III | III | III | III | III | III |
| Acrylsilane (parts) | I (1.0) | II (1.0) | I (1.0) | — | I (1.0) | — | III (1.0) | III (3.0) | III (2.0) | — | III (3.0) | — |
| Acid (parts) | I (0.5) | I (0.5) | II (0.5) | — | — | I (0.5) | I (0.5) | I (1.0) | II (1.5) | — | — | I (1.0) |
| Photosensitizer | II | II | II | II | II | II | I | I | I | I | I | I |
| Silica (parts) | I (12) | I (12) | I (12) | I (12) | I (12) | I (12) | II (5) | II (10) | II (15) | II (10) | II (10) | II (10) |

What is claimed is:

1. A photocurable organopolysiloxane composition which comprises, in admixture:

(a) 100 parts by weight of an organopolysiloxane having, in a molecule, at least one acryloxy-functional group represented by the general formula

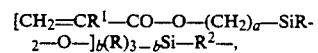
[CH₂=CR¹—CO—O—(CH₂)ₐ—SiR₂—O—]ᵦ(R)₃₋ᵦSi—R²—, in which R¹ is a hydrogen atom or a methyl group, each R is a monovalent hydrocarbon group independently from the others, R² is an oxygen atom or a divalent hydrocarbon group and each of the subscripts a and b is 1, 2 or 3;

(b) from 0.01 to 10 parts by weight of an acryloxy-containing trialkoxy silane represented by the general formula

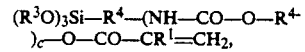
(R³O)₃Si—R⁴—(NH—CO—O—R⁴)ᶜ—O—CO—CR¹=CH₂, in which each R is a monovalent hydrocarbon group having 1 to 8 carbon atoms, each R¹ is a divalent hydrocarbon group having 1 to 20 carbon atoms independently from the others, R¹ has the same meaning as defined above and the subscript c is zero or 1;

(c) from 0.01 to 10 parts by weight of a carboxylic acid represented by the general formula

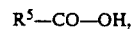
R⁵—CO—OH, in which R⁵ is a monovalent hydrocarbon group having 1 to 20 carbon atoms; and (d) from 0.01 to 10 parts by weight of a photosensitizer.

2. The photocurable organopolysiloxane composition as claimed in claim 1 wherein the carboxylic acid as the component (c) is acrylic acid or methacrylic acid.

3. The photocurable organopolysiloxane composition as claimed in claim 1 wherein the organopolysiloxane as the component (a) has two acryloxy functional groups represented by the general formula $$[CH_2=CR^1-CO-O-(CH_2)_a-SiR_2-O-]_b(R)_{3-b}Si-R^2-,$$

in which each symbol has the same meaning as defined above, each at one of the molecular chain ends.

4. The photocurable organopolysiloxane composition as claimed in claim 1 wherein the group denoted by R is a methyl group.

* * * * *